Jan. 8, 1946. H. G. BLAKESLEE 2,392,358
VACUUM COFFEE BREWER
Filed June 16, 1944
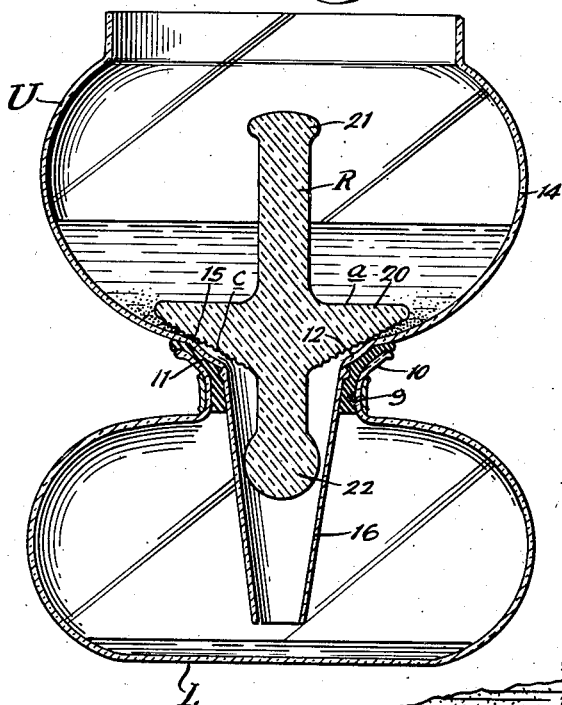
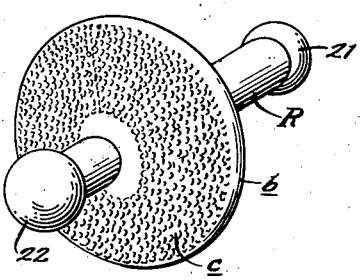
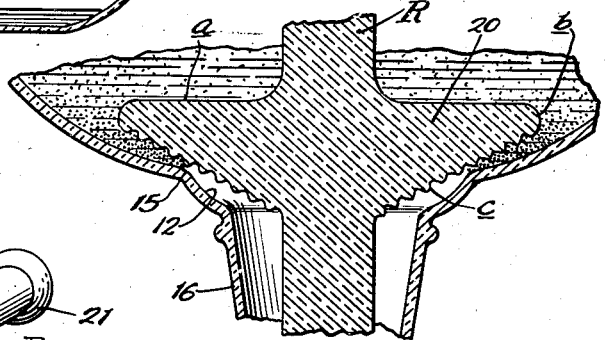
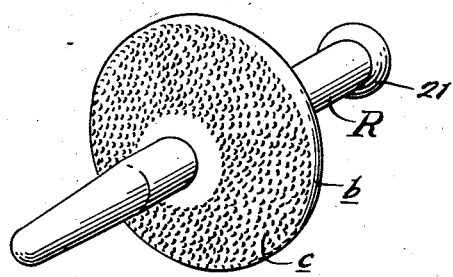
Inventor:
Herbert G. Blakeslee,
By Dunning & Dunning
Attorneys.

UNITED STATES PATENT OFFICE 2,392,358

VACUUM COFFEE BREWER

Herbert G. Blakeslee, Evanston, Ill., assignor to
Harvey Cory, Prescott, Ariz.

Application June 16, 1944, Serial No. 540,671

2 Claims. (Cl. 99—292)

This invention relates generally to a coffee brewer utensil of the vacuum type in which is included upper and lower bowls in the nature of a funnel and decanter, respectively, the former having a tubular stem depending into the decanter and being in sealed connection therewith. More particularly, the present improvements are directed to a filter device disposed within the upper bowl adjacent its base for filtering the coffee infusion during its passage from the funnel to the decanter.

It is an object of my invention to devise for the purposes noted a filter device which is simple in the extreme, inexpensive to produce, easy to clean, and otherwise adaptable to meet the operating requirements of a vacuum coffee brewer. More particularly the filter device is adaptable for use with coffee brewers differing somewhat in size and contour, as commonly encountered in commercial production. The filter device may be made of one piece of glass, ceramic, plastic or like material, in the general form of a rod from which is laterally extended a disk, integral or otherwise, of rather wide diameter, the underface of the disk tapering through a wide angle to provide a conical surface having a multitude of serrations or projecting points which define between them narrow tortuous passageways sufficiently constricted to hold back the flow of solid material such as finely comminuted coffee grounds, whereby to separate out such particles to produce a coffee infusion which is completely clear.

The filter device herein disclosed is normally rested upon a circular line seat near the base of the upper bowl, its conical disk being extended outwardly beyond this circular line of contact an appreciable distance and at an angle with respect to the base wall of the bowl so as to provide therebetween what is in effect an annular converging throat into which the coffee infusion must enter when descending into the lower bowl. Within this converging throat the suspended coffee particles are collected as the infusion flows past the filter device, tending to form at this point a porous cake which supplements the filtering action. The device in question not only meets the usual requirements of a filter, but it is devoid of metal parts which are generally considered to be objectionable. It also provides a filter element which will not readily clog, which offers little or no resistance to the up-flow of air, steam and water, which is effective on the down-flow of the infusion, with the aid of the accumulated porous cake, to effectively filter the infusion, and which may be readily cleaned, removed or replaced.

These and other objects of my invention are realized by a construction which is herein shown and described, a suggestive embodiment whereof is illustrated in the accompanying drawing, wherein—

Figure 1 is a central longitudinal section through a vacuum coffee brewer showing the filter unit operatively assembled therewith;

Fig. 2 is a view in perspective of the filter unit per se, looking toward its conical serrated under face;

Fig. 3 is a detail in enlarged section of the filter unit resting on its seat showing a porous cake of coffee particles accumulated within the throat leading to the passageway into the lower bowl, as when descent of the coffee infusion is under way; and Fig. 4 which is a view similar to Fig. 2 shows a slight modification in the construction of the filter unit.

The coffee brewer illustrated, which is of the vacuum type, comprises a lower bowl or container L in the form of a decanter adapted to be rested upon or over a heater (not shown). This bowl is provided in its upper region with a neck 9 which terminates in an outwardly flaring mouth 10. Seated in the mouth of the lower bowl is a gasket 11 whereon is rested the flaring base portion 12 of the upper bowl container U in the form of a funnel, the upper bowl having its side wall 14 curved downwardly and inwardly to join the portion 12 along a circular ridge-like line 15 with the flaring base. This circular line which defines the filtering zone, as will hereinafter appear, is radially situated a substantial distance from the bowl axis so that its circumferential length is greatly increased in consequence. A tube or hollow stem 16 which depends from the base is extended through the neck of the decanter downwardly to a point relatively close to its bottom.

The circular juncture line 15 between the funnel walls and its base I utilize as a seat whereon to rest a disk 20 which is carried by a rod R intermediately of its ends. This disk which is of relatively wide diameter is shown to have on its top a ledge $a$ of substantial area, and to be rounded at its periphery $b$ where it joins with a conical underface $c$ that is tapered at a wide angle. The top of the rod may be formed with a small head 21 to promote convenience in manipulation, and at its bottom with a ball 22 or other appropriate configuration to provide the requisite balance for holding the filter unit on or close to its seat during an initial stage of brewing when the liquid in the lower bowl is in a state of ebullition. The necessary weight for correct balancing may also be provided by elongating the rod downwardly, as suggested in Fig. 4.

The conical underface of the disk is provided with a multitude of serrations or other projecting points, a large number of which are in contact with the circular line seat 15 when the filter device is placed in operative position. The lower end of the filter device, whether it be formed into a ball or otherwise, may be extended sufficiently within the funnel stem to assist in centering the filter axially of the funnel.

With the parts operatively related as shown in Fig. 1, a coffee brewing operation may be performed. Finely ground coffee is introduced into the upper bowl, most of it lodging upon the ledge at the upper face of the disk where it cannot impede the later upflow of water from the lower bowl. Water to the desired amount is placed in the lower bowl and then brought to a high temperature upon or over an appropriate heater. Inasmuch as the gasket 11 seals the connection between the two bowls, an increasing pressure develops within the lower bowl to force the water upwardly within the stem, and past the filter serrations into the upper bowl. In this movement the water traverses the narrow passages between the disk serrations and the circular line seat whereon the filter device is rested. After ascending into the upper bowl and over the disk and in the proper volume, and in surrounding relation to the coffee particles for the requisite time, the coffee maker is removed from the heater (or vice versa) whereupon a negative pressure starts to develop within the lower bowl. The water in the upper bowl, together with the coffee particles suspended therein, is then drawn downwardly into the converging throat leading to the circular filtering zone at the line of juncture between the disk and its seat. During this movement the coffee particles are separated out from the infusion by the closely spaced serrations or projecting points. Only clear filtered infusion may then pass on into the hollow stem for accumulation in the lower bowl.

The current of descending water and suspended coffee particles, all moving into the converging throat to the outside of the circular filtering zone, produces at this point a growing deposit of coffee particles which accumulate rapidly and build up into a porous cake. The formation of this porous cake starts almost at the moment that descent of the coffee infusion commences, so that there is an almost immediate supplementary filtering action from this accumulated porous cake which increases until all the liquid in the upper bowl has passed therethrough.

The successful operation of the present filter device depends in large part upon the proper relationship existing between the lower serrated conical face of the disk beyond its circular line seat and the adjacent wall of the upper bowl. As shown and described, this relationship is such as to provide a converging throat of such size that, at the inception of descending movement of the coffee infusion, the suspended particles will be swept along to accumulate in this throated space in the form of a porous cake whereby to supplement the filtering action. This is advantageous because in commercial practice coffee bowls, and also the filter rods, are often produced non-uniformly to the point that a true circular contact therebetween is impossible to attain. In such event, the serrations or minute projecting points formed on the under surface of the filter are incapable of establishing a sufficiently continuous contact with the bowl seat throughout its entire distance to restrain passage therebetween of coffee particles which should be strained from the infusion. By providing, however for the accumulation of a porous filter cake to aid in straining out such particles at the point where the infusion passes over the circular line seat upon which the filter device is rested, I am able to greatly enhance the effectiveness of the filtering action and assure a dependable operation thereof. Moreover, the provision upon the upper face of the disk of a ledge of substantial area for support of the deposited coffee grounds makes for less resistance in the water upflow past the filter device, due to the fact that the throated passageway to the outside thereof remains substantially free and clear of all obstructing coffee particles. It is only after water in a substantial amount has entered the upper bowl and ascended upwardly beyond the disk, that the coffee particles supported thereon are engulfed to become suspended in the liquid body and be moved through various currents therein and ultimately be drawn down with the infusion into the converging throat for deposit therein in the form of a porous filter cake.

Non-uniformity in the bowls (usually of glass, plastic or the like) as commercially produced offers no difficulty in the attainment of excellent filtering results with the device herein described. There may be and usually is considerable variation in the diameters of the circular seats with which the filtering device must co-operate, but this creates no problem because the serrated conical underface of the disk has sufficient radial width to assure operative co-operation with many different seat diameters; and for reasons already pointed out, the non-uniformity of any such seat whereby it is slightly non-planar need not impair operability of the filter device due to the quick deposit in the throat leading to the filtering zone of the porous cake which greatly enhances the filtering action.

Another factor which contributes to the successful operation of the present filter device is the substantial circumferential length of the circular line seat upon the bottom of the upper bowl. This length is increased very greatly by locating the seat at a substantial radial distance from the bowl axis—a distance much in excess of the radius of the hollow stem at its widest point. The result is an increase, perhaps by double, in the circumferential length of the heat over that which would be obtainable if the seat were located at the juncture of the hollow stem with the bowl bottom. This is an important consideration because of the corresponding increase in the throated space for accommodation of the porous filtering cake. To some minor extent the presence of such a cake may be an obstruction tending to slow up the passage of coffee infusion therethrough, but by sufficiently enlarging this space to provide for wider distribution of the coffee sediment with a corresponding greater filtering capacity of the porous cake, I offset any clogging tendency thereby assuring an amply rapid flow of the filtered infusion.

I claim:

1. A vacuum type brewing apparatus, comprising a lower container, an upper container having a tube extending downwardly into said lower container, said upper container having its wall continuously curving inwardly and downwardly at the bottom toward the upper end of the tube and being connected therewith by a substantially funnel-shaped wall portion which is in angular relation to said bottom wall, the juncture of said wall portions forming an annular ridge in the provision of a line contact seat which is spaced materially from the upper end of the tube both radially and axially, and an imperforate filter element having a disc-like portion, the lower face of which is of conical form for seating engagement with said seat.

2. A vacuum type brewing apparatus, comprising a lower container, an upper container having a tube extending downwardly into said lower container, said upper container having its wall continuously curving inwardly and downwardly at the bottom toward the upper end of the tube and being connected therewith by a substantially funnel-shaped wall portion which is in angular relation to said bottom wall, the juncture of said wall portions forming an annular ridge in the provision of a line contact seat which is spaced materially from the upper end of the tube both radially and axially, an imperforate filter element having a disc-like portion, the lower face of which is of conical form for seating engagement with said seat, and said seat being disposed materially within the outer circumference of the conical face of the filter element with the portion of said face outwardly of said seat overlying and substantially paralleling the lower inwardly curved wall portion of the upper bowl in the provision of a relatively thin annularly flaring filter cake-forming bed between said face and said lower curved wall.

HERBERT G. BLAKESLEE.